(12) United States Patent
Oh

(10) Patent No.: US 12,243,247 B2
(45) Date of Patent: Mar. 4, 2025

(54) METHOD AND APPARATUS FOR TRACKING HAND JOINTS

(71) Applicant: Samsung Electronics Co., Ltd., Suwon-si (KR)

(72) Inventor: Paul Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 17/314,082

(22) Filed: May 7, 2021

(65) Prior Publication Data

US 2022/0198682 A1    Jun. 23, 2022

(30) Foreign Application Priority Data

Dec. 17, 2020    (KR) .................. 10-2020-0177251

(51) Int. Cl.
  *G06T 7/246* (2017.01)
  *G06T 7/73* (2017.01)
  *G06V 40/20* (2022.01)
(52) U.S. Cl.
  CPC .............. *G06T 7/251* (2017.01); *G06T 7/75* (2017.01); *G06V 40/28* (2022.01); *G06T 2200/04* (2013.01); *G06T 2207/30196* (2013.01)
(58) Field of Classification Search
  CPC ....... G06T 7/251; G06T 7/75; G06T 2200/04; G06T 2207/30196; G06V 40/28
  See application file for complete search history.

(56) References Cited

U.S. PATENT DOCUMENTS

| 6,515,669 B1 * | 2/2003 | Mohri .................... G06F 3/017 345/474 |
| 8,259,996 B2 | 9/2012 | Shamaie |
| 9,939,914 B2 * | 4/2018 | Fleishman ............. G06F 3/017 |
| 10,372,228 B2 * | 8/2019 | Mao ....................... G06T 7/285 |

(Continued)

FOREIGN PATENT DOCUMENTS

| JP | 2014-54483 A | 3/2014 |
| JP | 2015-191519 A | 11/2015 |

(Continued)

OTHER PUBLICATIONS

Q. Fu, "Tracking whole hand kinematics using extended Kalman filter," 2010 Annual International Conference of the IEEE Engineering in Medicine and Biology, Buenos Aires, Argentina, 2010, pp. 4606-4609, doi: 10.1109/IEMBS.2010.5626513. https://ieeexplore.ieee.org/stamp/stamp.jsp?tp=&arnumber=5626513 (Year: 2010).*

(Continued)

*Primary Examiner* — Matthew C Bella
*Assistant Examiner* — Andrew B. Jones
(74) *Attorney, Agent, or Firm* — NSIP Law

(57) ABSTRACT

A method and apparatus for tracking hand joints are disclosed, where the method of tracking hand joints includes estimating angle information of finger joints based on initial positions of hand joints obtained from an image, generating a kinematic model of the hand joints based on the initial positions of the hand joints and the angle information of the finger joints, and tracking the hand joints by updating at least one of positions or angles of the hand joints based on the initial positions of the hand joints and the kinematic model.

27 Claims, 11 Drawing Sheets

(56) References Cited

U.S. PATENT DOCUMENTS

| | | | |
|---|---|---|---|
| 2019/0278376 | A1 | 9/2019 | Kutliroff et al. |
| 2020/0286302 | A1 | 9/2020 | Lee et al. |
| 2021/0125371 | A1* | 4/2021 | Wang ................. G06T 7/74 |
| 2023/0252670 | A1* | 8/2023 | Xiang ................. G06V 40/11 382/103 |

FOREIGN PATENT DOCUMENTS

| | | | |
|---|---|---|---|
| KR | 10-2019-0131417 A | | 11/2019 |
| TW | 200937350 A | * | 9/2009 |

OTHER PUBLICATIONS

C.-H. Yoo "Fast and Accurate 3D Hand Pose Estimation via Recurrent Neural Network for Capturing Hand Articulations," in IEEE Access, vol. 8, pp. 114010-114019, 2020, doi: 10.1109/ACCESS.2020.3001637.https://ieeexplore.ieee.org/stamp/stamp.jsp?tp=&arnumber=9114986 (Year: 2020).*

Nelson JE Finger motion, wrist motion and tendon travel as a function of keyboard angles. Clin Biomech (Bristol, Avon). Aug. 2000; 15(7):489-98. doi: 10.1016/s0268-0033(00)00011-5. PMID: 10831808. https://www.sciencedirect.com/science/article/pii/S0268003300000115?via%3Dihub (Year: 2000).*

Sepehri, Afshin et al. "Employing the Hand as an Interface Device." J. Multim. 1 (2006): 18-29. http://www.ojs.academypublisher.com/index.php/jmm/article/viewArticle/01071829 (Year: 2006).*

Cerveri et al (Cerveri, P. I. E. T. R. O., et al. "Finger kinematic modeling and real-time hand motion estimation." Annals of biomedical engineering 35 (2007): 1989-2002., hereinafter "Cerveri") https://link.springer.com/article/10.1007/s10439-007-9364-0 (Year: 2007).*

Stenger, Bjoern, et al., "Model-Based Hand Tracking Using an Unscented Kalman Filter," *BMVC*, vol. 1. 2001 (pp. 1-10).

Fu, Qiushi et al., "Tracking whole hand kinematics using extended Kalman filter," *2010 Annual International Conference of the IEEE Engineering in Medicine and Biology. IEEE*, 2010 (pp. 1-4).

Casiez, Géry, et al., "1€ Filter: A Simple Speed-based Low-pass Filter for Noisy Input in Interactive Systems," Proceedings of the SIGCHI Conference on Human Factors in Computing Systems, 2012 (pp. 1-4).

* cited by examiner

METHOD AND APPARATUS FOR TRACKING HAND JOINTS

CROSS-REFERENCE TO RELATED APPLICATIONS

This application claims the benefit under 35 USC § 119(a) of Korean Patent Application No. 10-2020-0177251 filed on Dec. 17, 2020, in the Korean Intellectual Property Office, the entire disclosure of which is incorporated herein by reference for all purposes.

BACKGROUND

Field

The following description relates to a method and apparatus for tracking hand joints.

Description of Related Art

A user may use hands as the means of communication to make various signs or gestures. An augmented reality (AR) device or a virtual reality (VR) device may generate a natural motion image by applying three-dimensional (3D) data on a movement or motion of the hands, extracted through motion capture, to a character modeled by a computer, or may perform various functions, such as selecting a virtual menu through a movement of the hands. The user may not see the surroundings while wearing the AR device. Thus, the hand motions of the user may be recognized and functions may be performed corresponding to the hand motions. The performance of the functions will improve on more accurately tracking of the positions and angles of hand joints of the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of tracking hand joints, the method including estimating angle information of finger joints based on initial positions of hand joints obtained from an image, generating a kinematic model of the hand joints based on the initial positions of the hand joints and the angle information of the finger joints, and tracking the hand joints by updating at least one of positions or angles of the hand joints based on the initial positions of the hand joints and the kinematic model.

The estimating of the angle information may include setting a three-dimensional (3D) local coordinate system based on pose information of a palm connected to the finger joints, and performing rotation conversion for each of the finger joints based on the 3D local coordinate system.

The setting of the 3D local coordinate system may include estimating the pose information of the palm from position information of joints of the palm, and generating 3D local coordinate axes having a point in the palm as the origin based on the pose information of the palm.

The performing may include determining whether the finger joints are bent based on the 3D local coordinate system, and adaptively calculating rotation conversion information for each of the finger joints based on a result of the determining.

The determining may include performing rotation conversion for all the hand joints according to a rotation matrix for rotating all the hand joints based on the 3D local coordinate system, calculating a basis of a plane on which each finger is located, in response to all the hand joints being on the plane after the rotation conversion, estimating yaw angles of the finger joints according to a bending estimation parameter based on the basis, and determining whether the finger joints are bent based on a comparison of the estimated yaw angles to a threshold.

The adaptively calculating may include estimating first roll angles of the finger joints based on a geometry of the finger joints in a current frame, in response to the determination that the finger joints are bent, and calculating pitch angles and yaw angles of the finger joints based on the first roll angles.

The adaptively calculating may include estimating second roll angles of the finger joints based on roll angles of the finger joints in a previous frame and initial roll angles that are set for the finger joints, in response to the determination that the finger joints are stretched, and calculating pitch angles and yaw angles of the finger joints based on the second roll angles.

The estimating of the second roll angles may include estimating the second roll angles of the finger joints based on the roll angles of the finger joints in the previous frame, the initial roll angles that are set for the finger joints, and roll angles of other fingers in the current frame.

The tracking may include updating at least one of initial positions of the finger joints or the angle information of the finger joints by an extended Kalman filter that is based on the kinematic model, and tracking the hand joints based on the updated positions or the updated angle information.

The updating of at least one of the initial positions of the finger joints or the angle information of the finger joints may include setting, as a state of a current frame, angles of the hand joints and a position and velocity of a wrist that are obtained by the extended Kalman filter, predicting positions and angles of the hand joints in a future frame from the state of the current frame, and updating the positions and angles of the hand joints with the predicted positions and angles.

The positions and angles of the hand joints may be dependent on a positional relationship between hand joints that are connected to each other.

The positions and angles of the hand joints may be determined based on a position of a hand joint adjacent to a wrist, among hand joints connected to each other, and an angle at which the hand joint is bent relative to a position of the wrist.

The image may include image frames, and the method may include receiving initial positions calculated from the image frames.

In another general aspect, there is provided an apparatus for tracking hand joints, the apparatus including a communication interface configured to receive initial positions of hand joints obtained from an image, and a processor configured to estimate angle information of finger joints based on initial positions, to generate a kinematic model of the hand joints based on the initial positions of the hand joints and the angle information of the finger joints, and to track the hand joints by updating at least one of positions or angles of the hand joints based on the initial positions of the hand joints and the kinematic model.

The processor may be configured to set a three-dimensional (3D) local coordinate system based on pose information of a palm connected to the finger joints, and to perform rotation conversion for each of the finger joints based on the 3D local coordinate system.

The processor may be configured to estimate the pose information of the palm from position information of joints of the palm, and to generate 3D local coordinate axes having a point in the palm as the origin based on the pose information of the palm.

The processor may be configured to determine whether the finger joints are bent based on the 3D local coordinate system, and to adaptively calculate rotation conversion information for each of the finger joints based on a result of the determining.

The processor may be configured to perform rotation conversion for all the hand joints according to a rotation matrix for rotating all the hand joints based on the 3D local coordinate system, to calculate a basis of a plane on which each finger is located, in response to all the hand joints being on the plane after the rotation conversion, to estimate yaw angles of the finger joints according to a bending estimation parameter based on the basis, and to determine whether the finger joints are bent based on a comparison of the estimated yaw angles to a threshold.

The processor may be configured to update at least one of initial positions of the finger joints or the angle information of the finger joints by an extended Kalman filter that is based on the kinematic model, and to track the hand joints based on the updated positions or the updated angle information.

In another general aspect, there is provided an apparatus for tracking hand joints, the apparatus including a communication interface configured to receive an image of a hand from an image sensor, a processor configured to estimate three-dimensional (3D) position information of hand joints from the image of the hand, estimate angle information of the hand joints based on the 3D position information of the hand joints, generate a kinematic model of the hand joints based on the 3D position information and the angle information of the hand joints, update at least one of 3D position information or the angle information of the hand joints by an extended Kalman filter based on the kinematic model, and track the hand joints based on the updated position information or the updated angle information.

The processor may be configured to set a three-dimensional (3D) local coordinate system based on pose information of a palm connected to finger joints of the hand, determine whether the finger joints are bent based on the 3D local coordinate system, estimating first roll angles of the finger joints based on a geometry of the finger joints in a current frame, in response to the finger joints being bent, estimating second roll angles of the finger joints based on roll angles of the finger joints in a previous frame and initial roll angles that are set for the finger joints, in response to the finger joints not being bent, and calculate pitch angles and yaw angles of the finger joints based on one of the first roll angles and the second roll angles.

The apparatus may include a memory configured to store the angle information of the hand joints, 3D position information of the hand joints, the updated position information, and the updated angle information of the hand joints.

The communication interface may be configured to transmit a result of tracking the hand joints to outside the apparatus.

Other features and aspects will be apparent from the following detailed description, the drawings, and the claims.

Figure 1:
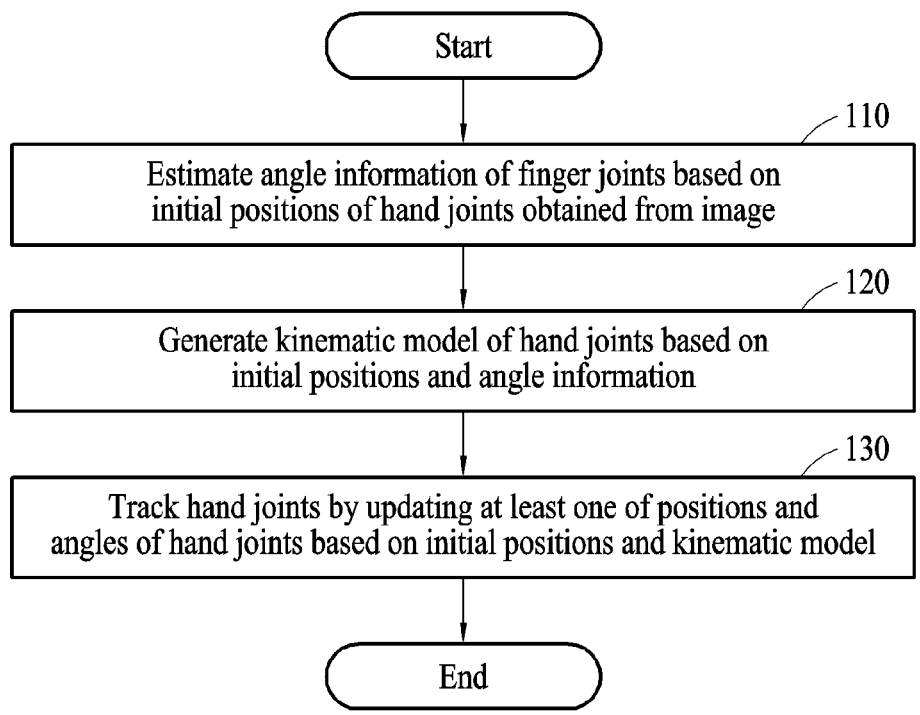
FIG. 1 illustrates an example of a method of tracking hand joints.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as A, B, C, (a), (b), (c), "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," "has," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an example of a method of tracking hand joints. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions. FIG. 1 illustrates an example of tracking hand joints of a user through the process of operations 110 to 130 using an apparatus for tracking hand joints (hereinafter, the "tracking apparatus").

In operation 110, the tracking apparatus estimates angle information of finger joints based on initial positions of the hand joints of the user that are obtained from an image. In an example, the image may include image frames. In addition, the initial positions of the hand joints may be received after they are calculated by a hand pose estimation module (See 210 of FIG. 2). The hand pose estimation module may be configured separately from the tracking apparatus to estimates angle information of finger joints based on initial positions of the hand joints of the user from the image frames that are sequentially input, or may be calculated by the tracking apparatus itself from image frames including a hand. In an example, the tracking apparatus may further include an image sensor or a camera sensor to capture the hand.

For example, in operation 110, the tracking apparatus may set a three-dimensional (3D) local coordinate system based on pose information of a palm connected to the finger joints. The pose information of the palm may include, for example, six-degree of freedom (6-DOF) pose information of the palm. An example of setting the 3D local coordinate system by the tracking apparatus will be described in detail below with reference to FIG. 4.

In an example, the tracking apparatus may perform rotation conversion for each of the finger joints based on the 3D local coordinate system. In an example, the tracking apparatus may perform rotation conversion for each of the finger joints in a manner that adaptively estimates the angles according to states of the different fingers. In an example, the tracking apparatus may determine whether the finger joints are bent based on the 3D local coordinate system. The tracking apparatus may determine whether the finger joints are bent, by a bending estimation parameter expressed in Equation 15, for example. An example of determining whether the finger joints are bent, by the tracking apparatus will be described in further detail below with reference to FIG. 5.

The tracking apparatus may adaptively calculate rotation conversion information for each of the finger joints based on a result of the determining whether the finger joints are bent. Here, the rotation conversion information may include, for example, pitch, yaw, and roll angles. The tracking apparatus may perform rotation conversion by adaptively calculating the rotation conversion information for each of the finger joints.

For example, when it is determined that the finger joints are bent, the tracking apparatus may estimate first roll angles of the finger joints based on a geometry of the finger joints in a current frame. The tracking apparatus may calculate pitch angles and yaw angles of the finger joints based on the first roll angles.

In another example, when it is determined that the finger joints are stretched, the tracking apparatus may estimate second roll angles of the finger joints based on roll angles of the finger joints in a previous frame and initial roll angles that are set for the finger joints. For example, the tracking apparatus may estimate the second roll angles of the finger joints based on the roll angles of the finger joints in the previous frame and the initial roll angles that are set for the finger joints and further on roll angles of other fingers in the current frame. The tracking apparatus may calculate pitch angles and yaw angles of the finger joints based on the second roll angles.

Figure 3:
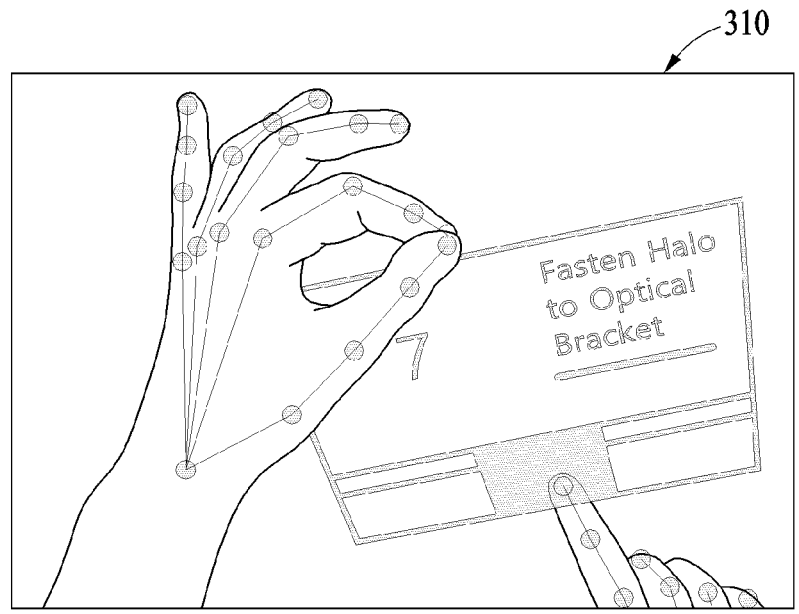
FIG. 3 illustrates examples of initial positions of finger joints.
Figure 3:
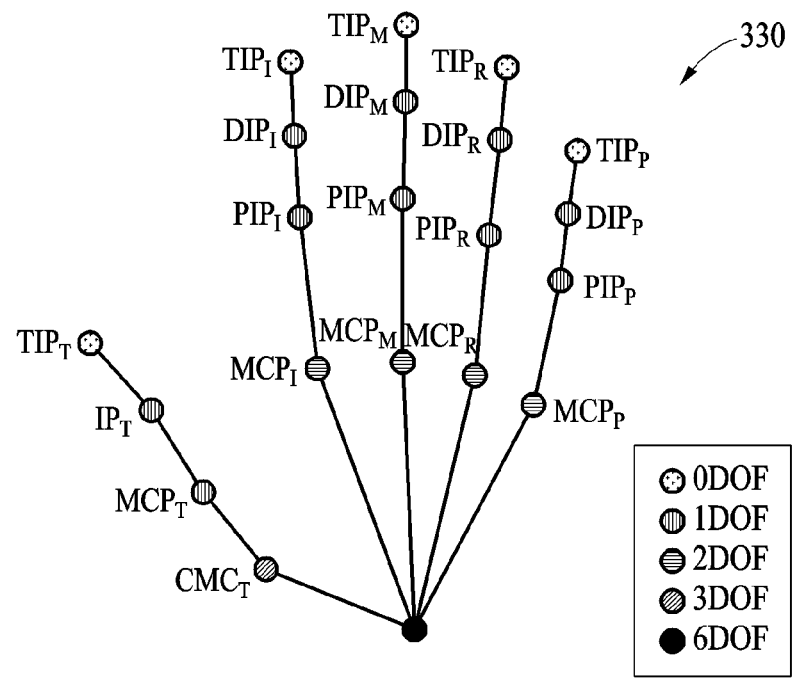

In operation 120, the tracking apparatus generates a kinematic model of the hand joints based on the initial positions and the angle information of the finger joints. The kinematic model may be, for example, a hand model including 21 joints as shown in FIG. 3, wherein each finger is connected from the wrist to the fingertip. In the kinematic model, the movements of the finger joints are not mutually independent but mutually organic and may be the sum of rotational motions according to the angles at which the fingers are bent.

For example, the tracking apparatus may update at least one of the initial positions or the angle information of the finger joints by an extended Kalman filter (EKF) that is based on the kinematic model generated in operation 120. An example of updating at least one of the initial positions and the angle information of the finger joints by the extended Kalman filter, by the tracking apparatus will be described in more detail below with reference to FIG. 8.

In operation 130, the tracking apparatus tracks the hand joints by updating at least one of positions and angles of the hand joints based on the initial positions of the finger joints and the kinematic model. In an example, the positions and angles of the finger joints may be determined depending on the positional relationship between hand joints connected to each other. In an example, the positions and angles of the finger joints may be determined based on a position of a hand joint adjacent to the wrist, among hand joints connected to each other, and an angle at which the hand joint is bent relative to a position of the wrist. Therefore, the tracking apparatus may track the hand joints including a pose of the hand by updating the positions and angles of the hand joints.

In an example, the positions of the joints tracked by the tracking apparatus may be used to continuously predict the next pose of the hand through a prediction model. Further, the predicted hand pose may be utilized to update the poses of the joints in the next frame or to compensate for latency. Here, the latency may be a time required to project hand joints estimated from a sensor input onto a display, including the process of estimating the positions of the hand joints.

Figure 2:
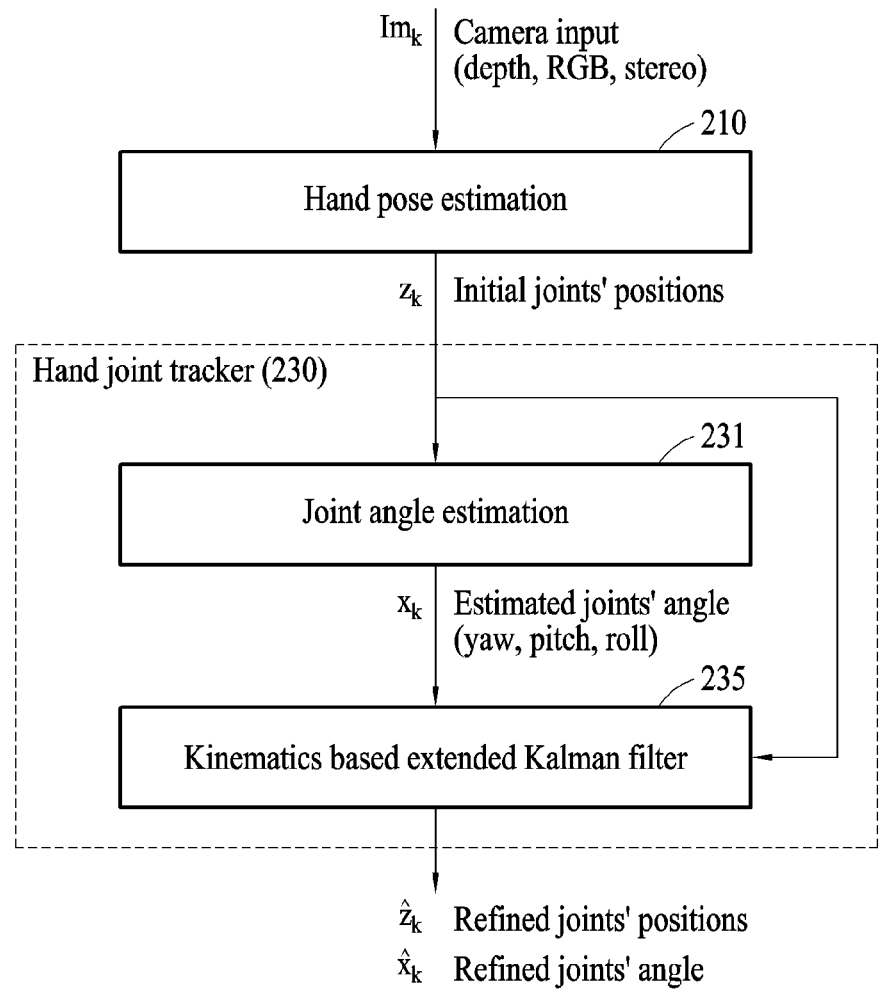
FIG. 2 illustrates an example of a method of tracking hand joints.

FIG. 2 illustrates an example of a method of tracking hand joints. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. Referring to FIG. 2, a hand pose estimation module 210 and an apparatus 230 for tracking hand joints (hereinafter, the "tracking apparatus" or hand joint tracker 230) are illustrated. The tracking apparatus 230 may include, for example, a joint angle estimation module 231 and a tracking module 235 including a kinematics (kinematic model) based EKF.

The hand pose estimation module 210 may receive an image $Im_k$ captured through a camera. In this example, the image $Im_k$ may be, for example, any one of a depth image, an RGB color image, and a stereo image. The hand pose estimation module 210 may estimate 3D position information $z_k$ of the hand joints from the image $Im_k$. In an example, the 3D position information $z_k$ may correspond to information indicating the initial positions of the hand joints of the user.

Each of the hand joints is connected to another joint as a segment. Therefore, in an example, the position of each joint is not independently determined. The position of each joint may be determined, for example, by the position of a joint close to the wrist, among the joints connected to each other, and the angle at which the joint is bent. However, the initial positions of the hand joints obtained through the hand pose estimation module 210 may not include angle information, for example, as shown in FIG. 3. Thus, the angle information of the joints may be estimated from the initial positions of the hand joints. The angle information may include, for example, a yaw angle, a pitch angle, and a roll angle. As will be described in more detail below, the tracking apparatus 230 may generate a system function and model suitable for kinematics of the hand by utilizing the initial positions and the estimated angle information of the hand joints, and correct the positions and angles of the hand joints through the extended Kalman filter.

The tracking apparatus 230 may extract the position and angle information of the joints in which jittering noise and pose errors are minimized from the 3D position information $z_k$ of the joints estimated by the hand pose estimation module 210. Here, the "jittering noise" may be the noise caused by unstable signal differences between desired signals and signals that are actually generated.

The tracking apparatus 230 may utilize the kinematic model of the hand joints or hand to effectively remove the jittering noise and pose errors. To utilize the kinematic model of the hand, the tracking apparatus 230 may use the angle information between the hand joints connected to each other.

The joint angle estimation module 231 may estimate angle information $x_k$ of finger joints to calculate kinematics from the 3D (3-DoF) positions of the hand joints. The angle information $x_k$ may include a yaw angle, a pitch angle, and a roll angle. The joint angle estimation module 231 may estimate the angle information $x_k$ of the joints, assuming that the finger joints are on the same plane, thereby reducing the complexity of angle calculation.

In an example, the joint angle estimation module 231 may adaptively estimate the angle information $x_k$ of the finger joints, for example, based on states of the fingers, such as whether the fingers are bent or stretched.

The tracking module 235 may output updated 3D position information $\hat{z}_k$ and updated angle information $\hat{x}_k$ of the joints by inducing kinematics of the 3D position information $z_k$ of the hand joints and the angle information $x_k$ of the finger joints as a non-linear function and applying the non-linear function to the EKF.

FIG. 3 illustrates examples of initial positions of finger joints. Referring to FIG. 3, an example 310 showing a hand joint model and an example 330 showing a degree of freedom of a motion of each joint in the hand joint model are illustrated.

The initial positions of the finger joints used by the tracking apparatus to estimate the angle information of the finger joints in operation 110 described above may be provided, for example, in the form as shown in the example 330. A hand may be represented, for example, by a total of 21 joints including the wrist, and each finger may include four joint segments. In addition, each finger may have different degrees of freedom for the positions of the joints. For example, the wrist may have 6 DOF and the first joint $CMC_T$ of the thumb that is connected to the wrist may have 3 DOF. The first joints $MCP_I$, $MCP_M$, $MCP_R$, and $MCP_P$ of the other four fingers that are connected to the wrist may have 2 DOF. The second joint $MCP_T$ connected to the first joint $CMC_T$ of the thumb may have 1 DOF, and the second joints $PIP_I$, $PIP_M$, $PIP_R$, and $PIP_P$ connected to the first joints $MCP_I$, $MCP_M$, $MCP_R$, and $MCP_P$ of the other four fingers may also have 1 DOF. The third joint $IP_T$ of the thumb and the third joints $DIP_I$, $DIP_M$, $DIP_R$, and $DIP_P$ of the other four fingers may have 1 DOF. The extremities $TIP_T$, $TIP_I$, $TIP_M$, $TIP_R$, and $TIP_P$ of the other five fingers may have 0 DOF.

As described above, the initial positions of the finger joints may include the positional relationship of the hand joints and the degrees of freedom of the motions.

Figure 4:
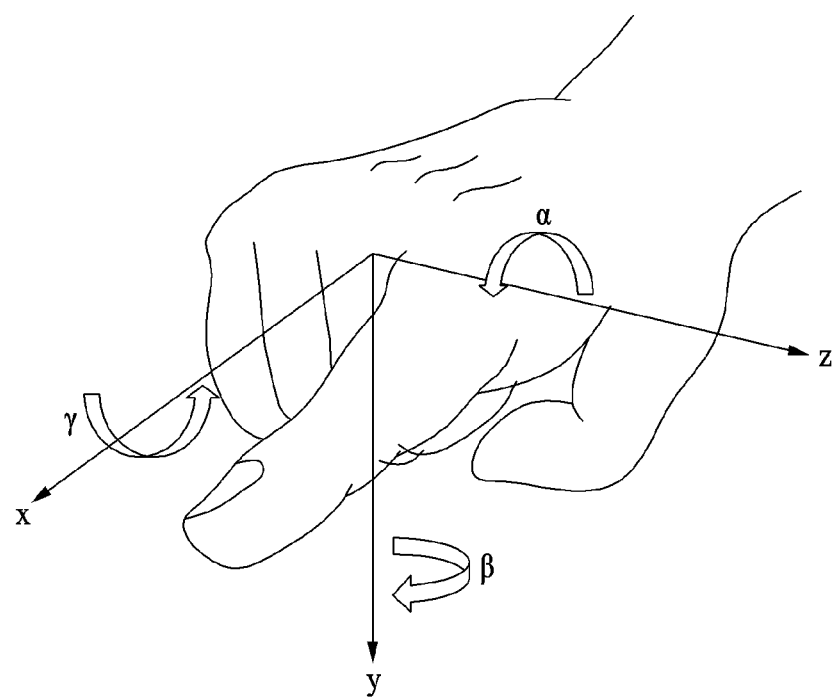
FIG. 4 illustrates an example of setting a three-dimensional (3D) local coordinate system.

FIG. 4 illustrates an example of setting a 3D local coordinate system. Referring to FIG. 4, 3D local coordinate axes x, y, and z generated by using a point in the palm as the origin are illustrated. In an example, the point in the palm may be predetermined.

For example, the tracking apparatus may estimate pose information of the palm from position information of joints of the palm. Here, the pose information of the palm may correspond to, for example, 6-DOF pose information.

The tracking apparatus may generate the 3D local coordinate axes having the point in the palm as the origin based on the pose information of the palm. The tracking apparatus may set a 3D local coordinate system based on the 3D local coordinate axes.

In an example, when the initial positions of the 21 joints of the hand are received, the tracking apparatus may generate new 3D local coordinate axes having a point W in the palm as the origin, for example, based on the 3D position information of the palm joints $MCP_I$, $MCP_M$, $MCP_R$, and $MCP_P$. In an example, the palm joints may correspond to the first joints of the four fingers, except for the thumb.

The tracking apparatus may generate the 3D local coordinate axes through Equations 1 to 5, for example.

In an example, the tracking apparatus may generate the x-axis by calculating an x-axial 3D vector in a 3D local coordinate system through Equation 1, for example.

$$e_x^l \propto \text{mean}(\{MCP_I, MCP_M, MCP_R, MCP_P\}) - W \quad \text{[Equation 1]}$$

For example, the x-axis of the local coordinate system may be defined as the normalized value of a value obtained by subtracting the 3D coordinates W of the wrist from the average of the 3D coordinates of the MCP joints of the index, middle, ring, and little fingers. The tracking apparatus may set the coordinate system through Equation 1 such that the direction from the wrist toward the fingers when the hand is open becomes the x-axis.

Further, the tracking apparatus may generate the y-axis of the 3D local coordinate system, as expressed by Equation 2.

$$e_y^l = s^l \underset{u}{\arg\min} \sum_{v \in S} (u \cdot v)^2, \text{ where } \|u\| = 1, \quad \text{[Equation 2]}$$

$$S = \{MCP_I' - W', MCP_M' - W', MCP_R' - W', NCP_P' - W',$$
$$MCP_I' - MCP_M', MCP_I' - MCP_R', MCP_I' - MCP_P',$$
$$MCP_M' - MCP_R', MCP_M' - MCP_P', MCP_R' - MCP_P'\}$$

In Equation 2, S may correspond to a set of vector values obtained by subtracting the 3D coordinates of the wrist joint from the 3D coordinates of the MCP joints of the four fingers (for example, the index, middle, ring, and little fingers), except for the thumb. $S^l$ may correspond to a sign-related parameter that makes the y-axial direction of the local coordinate system be the palm, rather than the back of the hand. $S^l$ may be +1 or −1, as defined in Equation 4. In addition, v may correspond to an element of the set S. The first line of Equation 2 may be interpreted as setting the coordinate system such that a 3D vector that produces the least square sum of inner products of all elements belonging to S becomes the y-axis of the local coordinate system.

For example, it may be assumed that the palm joints $MCP_I$, $MCP_M$, $MCP_R$, and $MCP_P$ and the point W in the palm are on or close to a plane. The tracking apparatus may calculate a normal vector perpendicular to the plane in the direction to the back of the hand in the situation where the palm joints and the point W are on the plane, as shown in Equation 2. The tracking apparatus may generate the y-axis of the 3D local coordinate system by the normal vector.

The tracking apparatus may generate the z-axis by calculating a z-axial 3D vector by performing a cross product operation on the x-axial and y-axial 3D vector values obtained in Equations 1 and 2, as expressed by Equation 3.

$$e_z^l = \text{cross}(e_x^l, e_y^l) \quad \text{[Equation 3]}$$

The tracking apparatus may normalize the magnitudes of the x-axial, y-axial, and z-axial 3D vectors $e_x^l$, $e_y^l$, and $e_z^l$ of the 3D local coordinate system to "1", and fix the y-axial direction of the 3D local coordinate system so as to be always the palm direction based on the right hand through Equation 4.

$$e_y^l := s^l e_{uy}^l, \; e_z^l := s^l e_z^l, \quad \text{[Equation 4]}$$
$$\text{where } s^l = \begin{cases} 1 & \text{if } e_z^l \cdot (MCP_I - MCP_P) > 0 \\ -1 & \text{else} \end{cases}$$

The tracking apparatus may estimate the 6-DoF pose information of the palm by calculating the yaw angle $\alpha_W$, the pitch angle $\beta_W$, and the roll angle $\gamma_W$ of the palm through the normalized x-axial, y-axial, and z-axial vectors of the 3D local coordinate system, as expressed by Equation 5.

$$\begin{bmatrix} \cos\alpha_W \cos\beta_W & -\sin\alpha_W \sin\beta_W & \sin\beta_W \\ \sin\alpha_W \cos\gamma_W + \cos\alpha_W \sin\beta_W \sin\gamma_W & \cos\alpha_W \cos\gamma_W - \sin\alpha_W \sin\beta_W \sin\gamma_W & -\cos\beta_W \sin\gamma_W \\ \sin\alpha_W \sin\gamma_W - \cos\alpha_W \sin\beta_W \cos\gamma_W & \cos\alpha_W \sin\gamma_W + \sin\alpha_W \sin\beta_W \cos\gamma_W & \cos\beta_W \cos\gamma_W \end{bmatrix} = [e_x^l \; e_y^l \; e_z^l] \quad \text{[Equation 5]}$$

The tracking apparatus may define a rotation matrix R to rotate all the hand joints to fit the 3D local coordinate system, as expressed by Equation 6.

$$R = [e_x^l e_y^l e_z^l]^T \quad \text{[Equation 6]}$$

The tracking apparatus may perform a rotation conversion on differential values between the 3D positions of all the hand joints and the 3D position of the point W in the palm, by a rotation matrix as expressed by Equation 7, for example.

$$MCP_I' = R(MCP_I - W) \quad \text{[Equation 7]}$$

The tracking apparatus may estimate the positions of the first joint $CMC_T$ of the thumb the palm joints $MCP_I$, $MCP_M$, $MCP_R$, and $MCP_P$ through a movement average filter of more than 5 frames, assuming that the first joint $CMC_T$ of the thumb and the palm joints $MCP_I$, $MCP_M$, $MCP_R$, and $MCP_P$ rarely move after the rotation conversion.

For example, it may be assumed that a set of joints $MCP_F$, $PIP_F$, $DIP_F$, and $TIP_F$, (where, $F \in \{I,M,R,P\}$) constituting each finger (for example, $CMC_T$, $MCP_T$, $IP_T$, and $TIP_T$ in the case of the thumb) is positioned on or close to a plane.

In this case, the tracking apparatus may calculate the basis for calculating the angles of each finger, that is, the yaw angle $\alpha_F$, the pitch angle $\beta_F$, and the roll angle $\gamma_F$, for example, through Equations 8 to 13.

The tracking apparatus may calculate a matrix $M_F$ including the combination of differential vectors of the palm joints, as expressed by Equation 8.

$$M_F = [PIP_F - MCP_F, DIP_F - PIP_F, TIP_F - DIP_F, DIP_F - MCP_F, TIP_F - PIP_F, TIP_F - MCP_F] \quad \text{[Equation 8]}$$

The tracking apparatus may derive an eigenvector $V_F$ and an eigenvalue $D_F$ through an eigen operation on the matrix $M_F$, as expressed by Equation 9.

$$V_F, D_F = \text{eigen}(M_F M_F^T) \quad \text{[Equation 9]}$$

The tracking apparatus may derive an eigenvector whose absolute value corresponds to the smallest eigenvalue as a vector $z_F$. The tracking apparatus may fix the direction of the vector $z_F$ to be always the positive direction based on the z-axial 3D vector $a_z^i$ for each frame through a condition operation as expressed by Equation 10, for example.

$$z_F = \begin{cases} V_F(\operatorname{argmin}|D_F|) & \text{if } V_F(\operatorname{argmin}|D_F|) \cdot e_z^i > 0 \\ -V_F(\operatorname{argmin}|D_F|) & \text{else} \end{cases} \quad \text{[Equation 10]}$$

The tracking apparatus may set the third element $z_F(3)$ of the 3D vector $z_F$ to be always positive (+) and perform an operation $y_F$ on the derived 3D vector $z_F$, as expressed by Equation 11.

$$y_F = \left(0, \operatorname{sign}(z_F(3)) \cdot \frac{z_F(3)}{v_N}, -\operatorname{sign}(z_F(3)) \cdot \frac{z_F(2)}{v_N}\right), \quad \text{[Equation 11]}$$

where $v_N$ is a normalizing parameter

Thereafter, the tracking apparatus may derive $x_F$ through a cross product operation of $y_F$ and $z_F$, as expressed by Equation 12.

$$x_F = \operatorname{cross}(y_F, z_F) \quad \text{[Equation 12]}$$

The tracking apparatus may calculate the basis of the plane on which each finger is positioned, as expressed by Equation 13. The basis of the plane on which each finger is positioned may be expressed in the form of a matrix having $x_F$, $y_F$, and $z_F$ as row vectors.

$$B_F = [x_F y_F z_F] \quad \text{[Equation 13]}$$

For example, it may be assumed that the joints $MCP_F$, $PIP_F$, $DIP_F$, and $TIP_F$ constituting each finger have the same roll angle $\gamma_F$ on the plane. In this case, the roll angles of the finger joints may be calculated from the roll angle $\gamma_F$ obtained in Equation 11, through an operation as expressed by Equation 14.

$$\cos \gamma_F = y_F(2), \sin \gamma_F = y_F(3) \quad \text{[Equation 14]}$$

Figure 5:
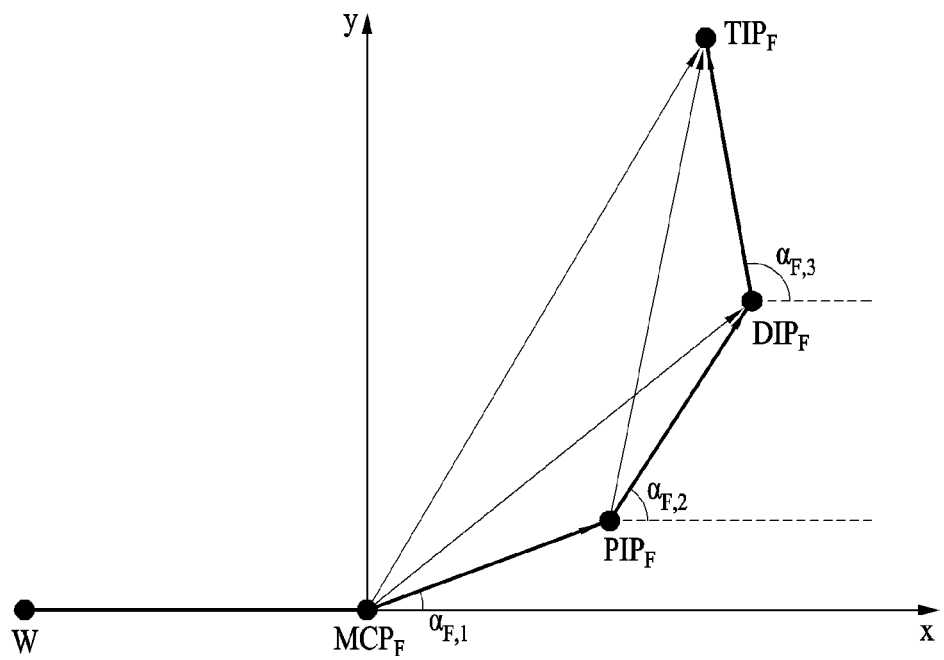
FIG. 5 illustrates an example of a relationship between bending of each finger joint and a yaw angle of each joint.

FIG. 5 illustrates an example of a relationship between bending of each finger joint and a yaw angle of each joint. FIG. 5 illustrates an example of the degrees at which joints $MCP_F$, $PIP_F$, $DIP_F$, and $TIP_F$ constituting each finger are bent based on a point W on the palm on a plane on which the fingers are positioned.

For example, if a finger is not sufficiently bent but stretched straight, the roll angle obtained in Equation 14 is not reliable. Thus, the tracking apparatus may determine whether the roll angle obtained through Equation 14 can be used for the finger through, for example, a bending estimation parameter $bend_F$ as expressed by Equation 15, for example. The bending estimation parameter $bend_F$ may indicate the degree of bending of a finger.

$$bend_F = \sqrt{\operatorname{var}(\{\tilde{\alpha}_{F,1}, \tilde{\alpha}_{F,2}, \tilde{\alpha}_{F,3}\})} \quad \text{[Equation 15]}$$

In Equation 15, $\{\tilde{\alpha}_{F,1}, \tilde{\alpha}_{F,2}, \tilde{\alpha}_{F,3}\}$ may correspond to approximated yaw angles of the finger joints.

Since the accurate yaw angles of the finger joints are unknown in Equation 15, the tracking apparatus may approximate or estimate the yaw angles of the finger joints as expressed by Equations 16 to 18, for example.

$$\tilde{\alpha}_{F,1} = \frac{\operatorname{sign}(x_{PIP} - x_{MCP}) \cdot (y_{PIP} - y_{MCP})}{\sqrt{(x_{PIP} - x_{MCP})^2 + (y_{PIP} - y_{MCP})^2 + (z_{PIP} - z_{MCP})^2}} \quad \text{[Equation 16]}$$

$$\tilde{\alpha}_{F,2} = \frac{\operatorname{sign}(x_{DIP} - x_{PIP}) \cdot (y_{DIP} - y_{PIP})}{\sqrt{(x_{DIP} - x_{PIP})^2 + (y_{DIP} - y_{PIP})^2 + (z_{DIP} - z_{PIP})^2}} \quad \text{[Equation 17]}$$

$$\tilde{\alpha}_{F,3} = \frac{\operatorname{sign}(x_{TIP} - x_{DIP}) \cdot (y_{TIP} - y_{DIP})}{\sqrt{(x_{TIP} - x_{DIP})^2 + (y_{TIP} - y_{DIP})^2 + (z_{TIP} - z_{DIP})^2}} \quad \text{[Equation 18]}$$

The tracking apparatus may compare the bending estimation parameter $bend_F$ to a threshold $Th_{bend}$. In an example, when a comparison shows that the bending estimation parameter $bend_F$ is greater than the threshold $Th_{bend}$, the tracking apparatus may determine that the finger joints are sufficiently "bent" and may use the roll angle derived in Equation 14. For example, the threshold $Th_{bend}$ may be set to a value between 0.08 and 0.2.

In another example, when the bending estimation parameter $bend_F$ is less than or equal to the threshold $Th_{bend}$, the tracking apparatus may determine that the finger joints are "stretched" and distrust the roll angles derived in Equation 14. In this case, the tracking apparatus may estimate roll angles of the finger joints in a current frame using roll angles of the finger joints in a previous frame and initial roll angles set for the finger joints.

To estimate a roll angle $\gamma_F^k$ in a kth frame, the tracking apparatus may average a roll angle $\gamma_F^{k-1}$ obtained in a (k−1)th frame and an initially set default roll angle $\gamma_F^{def}$, as expressed by Equation 19, for example.

$$\gamma_F^k = 0.5 \cdot (\gamma_F^{k-1} + \gamma_F^{def}) \quad \text{[Equation 19]}$$

The tracking apparatus may calculate the pitch angles $\beta_F$ and the yaw angles $\alpha_F$ of the joints as expressed by Equations 20 to 31, based on the angle calculated through Equation 14 if the fingers are bent and based on the angle calculated through Equation 19 if the fingers are stretched.

In detail, the tracking apparatus may calculate the pitch angles $\beta_F$ and the yaw angles $\alpha_F$ of the second joints $PIP_F$ of the fingers through Equations 20 to 23, for example.

$$\sin \alpha_{F,1} = \frac{\cos \gamma_F (PIP_F(y) - MCP_F(y)) + \sin \gamma_F (PIP_F(z) - MCP_F(z))}{\operatorname{norm}(PIP_F - MCP_F)} \quad \text{[Equation 20]}$$

$$\cos \alpha_{F,1} = \operatorname{sign}(PIP_F(x) - MCP_F(x))\sqrt{1 - (\sin \alpha_{F,1})^2} \quad \text{[Equation 21]}$$

$$\cos \beta_F = \frac{PIP_F(x) - MCP_F(x)}{\operatorname{norm}(PIP_F - MCP_F) \cos \alpha_{F,1}} \quad \text{[Equation 22]}$$

$$\sin \beta_F = \frac{\sin \gamma_F (PIP_F(y) - MCP_F(y)) - \cos \gamma_F (PIP_F(z) - MCP_F(z))^o}{\operatorname{norm}(PIP_F - MCP_F) \cos \alpha_{F,1}} \quad \text{[Equation 23]}$$

The tracking apparatus may calculate the pitch angles $\beta_F$ and the yaw angles $\alpha_F$ of the third joints $DIP_F$ of the fingers through Equations 24 to 27, for example.

$$\sin \alpha_{F,2} = \frac{\cos \gamma_F (DIP_F(y) - PIP_F(y)) + \sin \gamma_F (DIP_F(z) - PIP_F(z))}{\operatorname{norm}(DIP_F - PIP_F)} \quad \text{[Equation 24]}$$

-continued $$\cos \alpha_{F,2} = \text{sign}(DIP_F(x) - PIP_F(x))\sqrt{1 - (\sin \alpha_{F,2})^2} \quad \text{[Equation 25]}$$

$$\cos \beta_F = \frac{DIP_F(x) - PIP_F(x)}{norm(DIP_F - PIP_F) \cos \alpha_{F,2}} \quad \text{[Equation 26]}$$

$$\sin \beta_F = \frac{\sin \gamma_F(DIP_F(y) - PIP_F(y)) - \cos \gamma_F(DIP_F(z) - PIP_F(z))^o}{norm(DIP_F - PIP_F) \cos \alpha_{F,2}} \quad \text{[Equation 27]}$$

Further, the tracking apparatus may calculate the pitch angles $\beta_F$ and the yaw angles $\alpha_F$ of the fourth joints $TIP_F$ of the fingers through Equations 28 to 31, for example.

$$\sin \alpha_{F,3} = \frac{\cos \gamma_F(TIP_F(y) - DIP_F(y)) + \sin \gamma_F(TIP_F(z) - DIP_F(z))}{norm(TIP_F - DIP_F)} \quad \text{[Equation 28]}$$

$$\cos \alpha_{F,3} = \text{sign}(TIP_F(x) - DIP_F(x))\sqrt{1 - (\sin \alpha_{F,3})^2} \quad \text{[Equation 29]}$$

$$\cos \beta_F = \frac{TIP_F(x) - DIP_F(x)}{norm(TIP_F - DIP_F) \cos \alpha_{F,3}} \quad \text{[Equation 30]}$$

$$\sin \beta_F = \frac{\sin \gamma_F(TIP_F(y) - DIP_F(y)) - \cos \gamma_F(TIP_F(z) - DIP_F(z))^o}{norm(TIP_F - DIP_F) \cos \alpha_{F,3}} \quad \text{[Equation 31]}$$

Figure 6:
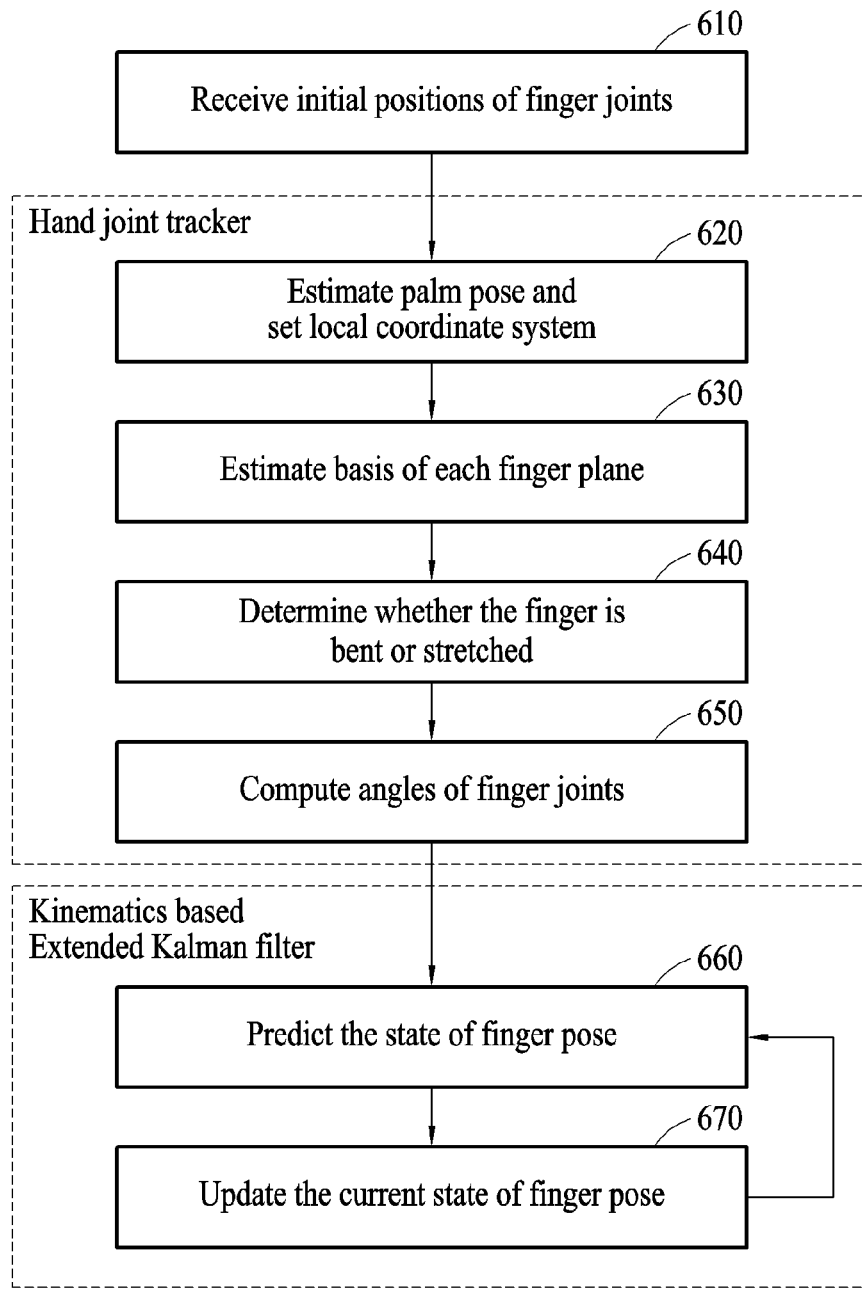
FIGS. 6 and 7 illustrate examples of methods of tracking hand joints.

FIG. 6 illustrates an example of a method of tracking hand joints. Referring to FIG. 6, the process of estimating finger joints by a tracking apparatus through operations 610 to 670 is illustrated. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

In operation 610, the tracking apparatus may receive 3D initial positions of hand joints estimated by the hand pose estimation module 210.

In operation 620, the tracking apparatus may estimate 6-DoF pose information of the palm based on the initial positions of the hand joints, and set a 3D local coordinate system. The tracking apparatus may generate new 3D local coordinate axes having a point in the palm as the origin. The tracking apparatus may set the 3D local coordinate system by utilizing joint information of the palm, and estimate a movement position and/or a wrist angle at which the wrist is rotated using the position of the palm as the origin.

In operation 630, the tracking apparatus may estimate the basis of a plane for finger joint angle estimation, based on the estimated 6-DoF pose information of the palm.

In operation 640, the tracking apparatus may determine whether the fingers are bent or stretched.

In operation 650, the tracking apparatus may calculate angle information (for example, the pitch angles, yow angles, and roll angles) of the finger joints based on the determined states of the fingers. In an example, if the fingers are bent, the tracking apparatus may calculate the angle information of the finger joints by utilizing a geometry of a current frame. In another example, if the fingers are stretched, the tracking apparatus may calculate the angle information of the finger joints by utilizing angle information in a previous frame and angle information of other fingers in the current frame. This is because calculating the angle information of the finger joints using the geometry of the current frame when the fingers are stretched may adversely affect the calculation of kinematics.

In operation 660, the tracking apparatus may predict (or define) a state corresponding to the angles of the hand joints and the position and velocity of the wrist by applying an extended Kalman filter to a kinematic model. For example, the tracking apparatus may induce kinematics on the positions and angles of the hand joints as a non-linear function and may apply the non-linear function to the extended Kalman filter.

In operation 670, the tracking apparatus may track movements of the hand joints by updating current hand pose information (for example, the positions and angles of the hand joints) predicted in a previous frame based on the initial positions of the finger joints and the angle information of the finger joints obtained in operation 650. In this example, the tracked movements of the hand joints may be used to continuously predict the next hand pose through a prediction model. In addition, the predicted pose may be stored in a buffer and used to update the poses of the hand joints in the next frame.

Figure 7:
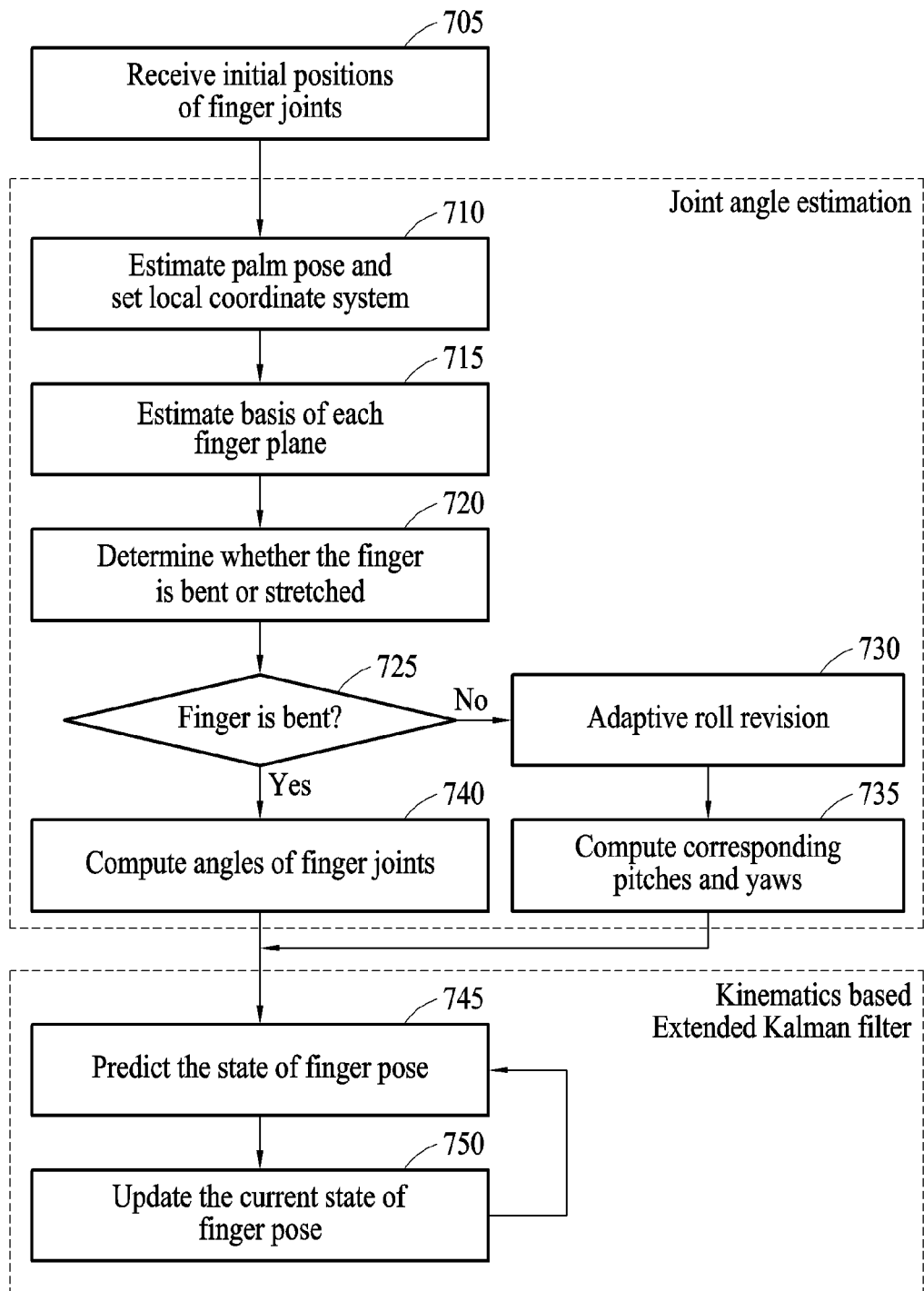

FIG. 7 illustrates an example of a method of tracking hand joints. Referring to FIG. 7, the process of estimating finger joints through operations 705 to 750 is illustrated. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

In operation 705, the tracking apparatus may receive 3D initial positions of hand joints estimated by the hand pose estimation module 210.

In operation 710, the tracking apparatus may estimate 6-DoF pose information of the palm based on the initial positions of the hand joints, and set a 3D local coordinate system. The tracking apparatus may set the 3D local coordinate system through, for example, Equations 1 to 7.

In operation 715, the tracking apparatus may estimate the basis of a plane for finger joint angle estimation, based on the estimated 6-DoF pose information of the palm. The tracking apparatus may estimate the basis of the plane for finger joint angle estimation through, for example, Equations 8 to 14.

In operation 720, the tracking apparatus may determine whether the fingers are bent or stretched. The tracking apparatus may determine the degrees of bending of the fingers through, for example, Equation 15.

In operation 725, the tracking apparatus may determine whether the fingers are bent.

When it is determined the fingers are not bent (in other words, are stretched) in operation 725, the tracking apparatus may adaptively calculate the roll angles of the finger joints, in operation 730. The tracking apparatus may calculate the roll angles of the finger joints through, for example, Equation 19.

In operation 735, the tracking apparatus may calculate the pitch angles and the yaw angles of the finger joints based on the calculated roll angles. The tracking apparatus may calculate the pitch angles and the yaw angles of the finger joints through, for example, Equations 20 to 31.

In another example, when it is determined that the finger joints are bent in operation 725, the tracking apparatus may calculate angle information of the finger joints, in operation 740. The tracking apparatus may calculate the angle information of the finger joints through, for example, Equations 8 to 14.

The process of operations 725 to 740 may correspond to a detailed example of operation 650 of calculating the angle information of the fingers in FIG. 6.

In operation 745, the tracking apparatus may define or predict a state corresponding to the angles of the hand joints and the position and velocity of the wrist by applying an extended Kalman filter to a kinematic model. For example, the tracking apparatus may induce kinematics on the positions and angles of the hand joints as a non-linear function and apply the non-linear function to the extended Kalman filter. For example, the tracking apparatus may predict the state corresponding to the angles of the hand joints and the position and velocity of the wrist through Equation 36, which will be described later.

In operation 750, the tracking apparatus may track current movements of the hand joints by updating current hand pose information (for example, the positions and angles of the hand joints) predicted in a previous frame based on the initial positions of the finger joints and the angle information of the finger joints obtained previously. For example, the tracking apparatus may predict the current movements of the finger joints through Equation 41, which will be described later.

Figure 8:
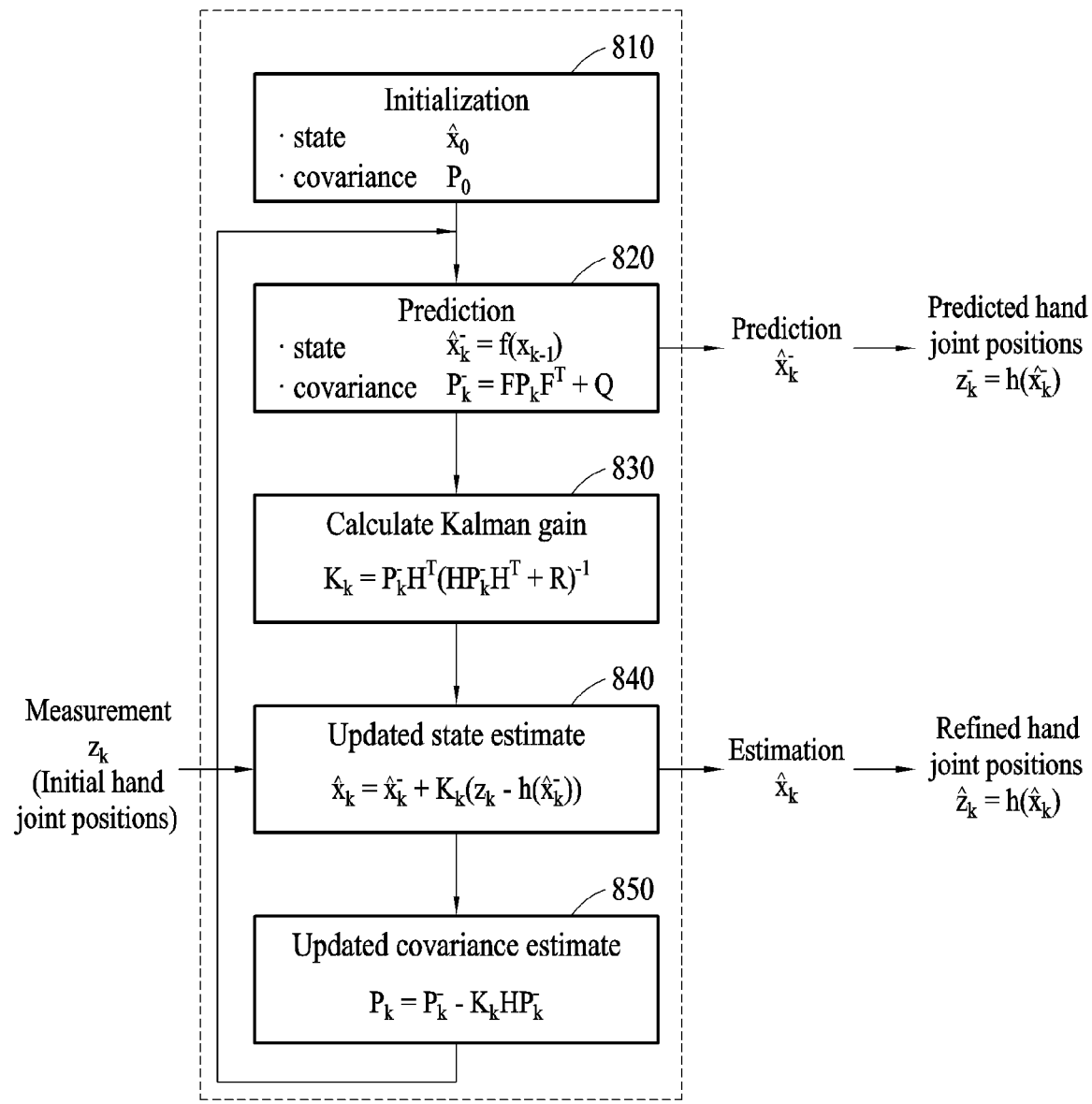
FIG. 8 illustrates an example of a method of tracking hand joints by an expanded Kalman filter (EKF) that is based on kinematics.

FIG. 8 illustrates an example of a method of tracking hand joints by an EKF that is based on kinematics. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, the process of correcting and predicting positions and angles of hand joints by setting, as a state, the angles of the hand joints and the position and velocity of the wrist derived by an extended Kalman filter considering a kinematic model of the hand joints by a tracking apparatus through operations 810 to 850 is illustrated.

In operation 810, the tracking apparatus may initialize a state vector and a covariance matrix to, for example, an initial state vector $\hat{x}_0$ and an initial covariance $P_0$. In this example, the initial state vector $\hat{x}_0$ may be the state that is set corresponding to the angles of the hand joints and the position and velocity of the wrist that are derived by the extended Kalman filter considering the kinematic model of the hand joints.

In operation 820, the tracking apparatus may predict a state vector and a covariance matrix. For example, the tracking apparatus may calculate the predicted state vector $\hat{x}_k^-$ through Equation 36, which will be described later. Further, the tracking apparatus may calculate the predicted covariance matrix $P_k^-$ through Equation 37, which will be described later. The tracking apparatus may calculate predicted joint positions $z_k^-$ in a future frame from, for example, the state vector in the current frame, based on the predicted state vector $\hat{x}_k^-$ and the predicted covariance matrix P.

In operation 830, the tracking apparatus may calculate a Kalman gain $K_k$. For example, the tracking apparatus may calculate the Kalman gain $K_k$ through Equation 40, which will be described later.

In operation 840, the tracking apparatus may update the current state vector $\hat{x}_k$ using the calculated Kalman gain $K_k$ and a difference between a measurement vector $z_k$ obtained by measuring the initial position of the finger joints for each joint in the hand of a user and the predicted joint position $h(\hat{x}_k^-)$ in the future frame. For example, the tracking apparatus may update the current state vector $\hat{x}_k$, as expressed by Equation 41, which will be described later. The tracking apparatus may correct the positions of the hand joints based on the updated current state vector.

In operation 850, the tracking apparatus may update the current covariance matrix $P_k$ based on a difference between the covariance matrix $P_k^-$ predicted in operation 820 and a value obtained by multiplying the predicted covariance matrix $HP_k^-$ corresponding to the positions of all joints from the current state vector by the Kalman gain $K_k$. For example, the tracking apparatus may update the current covariance matrix $P_k$, as expressed by Equation 42, which will be described later.

More specifically, a state vector x is, for example, a 34-dimensional vector and may be defined as expressed by Equation 32, for example.

$$x=[W(x),W(y),W(z),\Delta W(x),\Delta W(y),\Delta W(z),\alpha_W,\beta_W,\gamma_W,$$
$$\alpha_{I,1},\alpha_{I,2},\alpha_{I,3},\beta_I,\gamma_I,\alpha_{M,1},\alpha_{M,2},\alpha_{M,3},\beta_M,\gamma_M,\alpha_{R,1},$$
$$\alpha_{R,2},\alpha_{R,3},\beta_R,\gamma_R,\alpha_{P,1},\alpha_{P,2},\alpha_{P,3},\beta_P,\gamma_P,\alpha_{T,1},$$
$$\alpha_{T,2},\alpha_{T,3},\beta_T,\gamma_T] \quad \text{[Equation 32]}$$

In Equation 32, W(x), W(y), W(z) may correspond to the x-axial, y-axial, and z-axial values of position coordinates of the wrist joint, and $\Delta W(x)$, $\Delta W(y)$, $\Delta W(z)$ may correspond to the x-axial, y-axial, and z-axial values of variations in the position coordinates of the wrist joint. $\alpha_W$, $\beta_W$, $\gamma_W$ may correspond to the yaw, pitch, and roll values of the wrist joint, and $\alpha_{I,1}$, $\alpha_{I,2}$, $\alpha_{I,3}$ may correspond to the yaw values of the MCP, PIP, and DIP joints of the index finger. $\beta_I$, $\gamma_I$ may correspond to the overall pitch and roll values of the index finger. $\alpha_{M,1}$, $\alpha_{M,2}$, $\alpha_{M,3}$ may correspond to the yaw values of the MCP, PIP, and DIP joints of the middle finger, and $\beta_M$, $\gamma_M$ may correspond to the overall pitch and roll values of the middle finger. $\alpha_{R,1}$, $\alpha_{R,2}$, $\alpha_{R,3}$ and $\beta_R$, $\gamma_R$, $\alpha_{P,1}$, $\alpha_{P,2}$, $\alpha_{P,3}$ and $\beta_P$, $\gamma_P$, and $\alpha_{T,1}$, $\alpha_{T,2}$, $\alpha_{T,3}$ and $\beta_T$, $\gamma_T$. may correspond to the yaw values of the MCP, PIP, and DIP joints and the overall pitch and roll values of the ring finger, the little finger, and the thumb, respectively. In FIG. 8, $z_k$ on the left side of operation 840 may correspond to a measurement vector indicating the initial positions of the finger joints from among the hand joints of the user. The measurement vector $z_k$ may correspond to a vector listing the initial positions of the hand joints obtained through the hand pose estimation module described above. The measurement vector $z_k$ may be simplified as a measurement vector z.

The measurement vector z is a 63-dimensional vector and may be defined as in Equation 33, for example. However, examples are not limited thereto.

$$z=[W(x),W(y),W(z),CMC_T(x),CMC_T(y),CMC_T(z),\\ MCP_I(x),MCP_I(y),MCP_I(z), \ldots ,MCP_P(x),\\ MCP_P(y),MCP_P(z),MCP_T(x),MCP_T(y),MCP_T(z),\\ IP_T(x),IP_T(y),IP_T(z),TIP_T(x),TIP_T(y),TIP_T(z),PIP_I\\ (x),PIP_I(y),PIP_I(z),DIP_I(x),DIP_I(y),DIP_I(z),TIP_I\\ (x),TIP_I(y),TIP_I(z),PIP_P(x),PIP_P(y),PIP_P(z),DIP_P\\ (x),DIP_P(y),DIP_P(z),TIP_P(x),TIP_P(y),TIP_P(z)]$$ [Equation 33]

A correspondence function h(x) that makes a state vector x being a physical parameter of the hand correspond to the positions of all joints may be expressed by Equation 34.

$$h(x) = \begin{bmatrix} h_1(x) \\ h_2(x) \\ \vdots \\ h_{63}(x) \end{bmatrix}$$ [Equation 34]

In addition, the Jacobian matrix H of the correspondence function h(x) may be defined as expressed by Equation 35.

$$H = \begin{bmatrix} \frac{\partial h_1}{\partial W(x)} & \frac{\partial h_1}{\partial W(y)} & \cdots & \frac{\partial h_1}{\partial \gamma_T} \\ \frac{\partial h_2}{\partial W(x)} & \frac{\partial h_2}{\partial W(y)} & \cdots & \frac{\partial h_2}{\partial \gamma_T} \\ \vdots & \vdots & \ddots & \vdots \\ \frac{\partial h_m}{\partial W(x)} & \frac{\partial h_m}{\partial W(y)} & \cdots & \frac{\partial h_m}{\partial \gamma_T} \end{bmatrix}, \text{ where } H \propto R^{M \times N}$$ [Equation 35]

In Equation 35, M denotes the length of the measurement vector z, and N denotes the length of the state vector x. In an example, the length M of the measurement vector z may be 63, and the length N of the state vector x may be 34. However, examples are not necessarily limited thereto.

The tracking apparatus may predict a state vector through Equation 36, for example. The predicted state vector $\hat{x}_k^-$ may be used to predict the positions of the hand joints.

$$\hat{x}_k^-=f(\hat{x}_{k-1})=F\hat{x}_{k-1}$$ [Equation 36]

Further, the tracking apparatus may predict a covariance matrix through Equation 37, for example. The predicted covariance matrix $P_k^-$ may be used to calculate a Kalman gain.

$$P_k^-=FP_kF^T+Q$$ [Equation 37]

In Equation 37, Q denotes the covariance matrix for process noise, and F denotes a state transition matrix. The state transition matrix F may be defined as expressed by Equation 38.

$$F = I_{34 \times 34} + \begin{bmatrix} 0 & 0 & 0 & \tau & 0 & 0 & \cdots & 0 \\ 0 & 0 & 0 & 0 & \tau & 0 & \cdots & 0 \\ 0 & 0 & 0 & 0 & 0 & \tau & \cdots & 0 \\ \vdots & \vdots & \vdots & \vdots & \vdots & \vdots & \ddots & \vdots \\ 0 & 0 & 0 & 0 & 0 & 0 & \cdots & 0 \end{bmatrix}$$ [Equation 38]

In Equation 38, $I_{34 \times 34}$ denotes a unit matrix corresponding to the magnitude of the state vector x, and r denotes a unit time. In an example, r may be set to, for example, 1/60, that is, 0.0166. However, examples are not necessarily limited thereto.

The tracking apparatus may predict positions $z_k^-$ of the joints in a future frame from a state vector of a current frame by allowing the predicted state vector $\hat{x}_k^-$ to pass through a system function h, as expressed by Equation 39, for example.

$$z_k^-=h(\hat{x}_k^-)$$ [Equation 39]

For example, if R denotes a covariance matrix for measurement noise, the tracking apparatus may calculate the Kalman gain $K_k$ through Equation 40. The Kalman gain $K_k$ may have, for example, the form of a matrix. However, the examples are not necessarily limited thereto.

$$K_k=P_k^-H^T(HP_k^-H^T+R)^{-1}$$ [Equation 40]

The tracking apparatus may update the current state vector $\hat{x}_k$ as expressed by Equation 41, using the previously calculated Kalman gain $K_k$ and a difference between the measurement vector $z_k$ indicating the initial positions of the finger joints among the hand joints of the user and the joint positions $h(\hat{x}_k^-)$ predicted for the future frame.

$$\hat{x}_k=\hat{x}_k^-+K_k(z_4-h(\hat{x}_k^-))$$ [Equation 41]

Further, the tracking apparatus may update the current covariance matrix $P_k$ as expressed by Equation 42, based on a difference between the predicted covariance matrix $P_k^-$ and a value obtained by multiplying, by the Kalman gain $K_k$, the covariance matrix $HP_k^-$, corresponding to the positions of all the joints, predicted from the current state vector.

$$P_k=P_k^--K_kHP_k^-$$ [Equation 42]

The tracking apparatus may calculate, as expressed by Equation 43, the positions $\hat{z}_k$ of the hand joints with reduced jittering noise and pose error by allowing the estimated state vector $\hat{x}_k$ to pass finally through the system function h.

$$\hat{z}_k=h(\hat{x}_k)$$ [Equation 43]

The tracking apparatus may predict and update the state vector using, for example, only the state transition matrix F and the system model function h.

Figure 9:
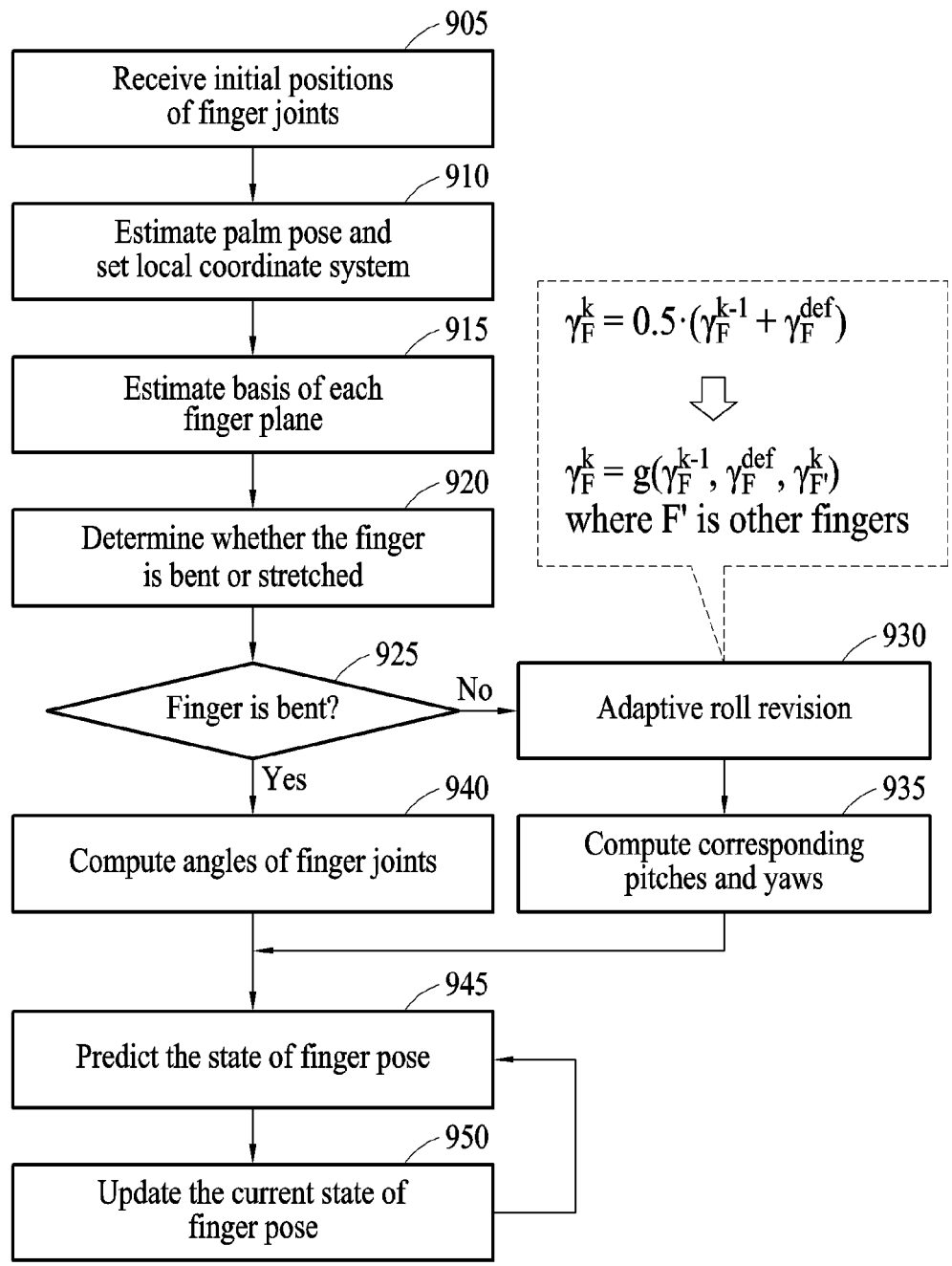
FIGS. 9 and 10 illustrate examples of methods of tracking hand joints.

FIG. 9 illustrates an example of a method of tracking hand joints. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 9 below, the descriptions of FIGS. 1-8 are also applicable to FIG. 9, and are incorporated herein by reference. Operations 905 to 950 of FIG. 9 are the same as operations 705 to 750 of FIG. 7. Thus, the above description may not be repeated here, and only operations differing from the example of FIG. 7 will be described.

When calculating the roll angles of the finger joints by, for example, Equation 19 in operation 930, the tracking apparatus may calculate the roll angles of the current fingers based on the roll angles $\gamma_F^{k-1}$ obtained in the previous frame and the initial roll angles $\gamma_F^{def}$ set for the finger joints and further on a function of roll angles $\gamma_F^k$, of other fingers.

Figure 10:
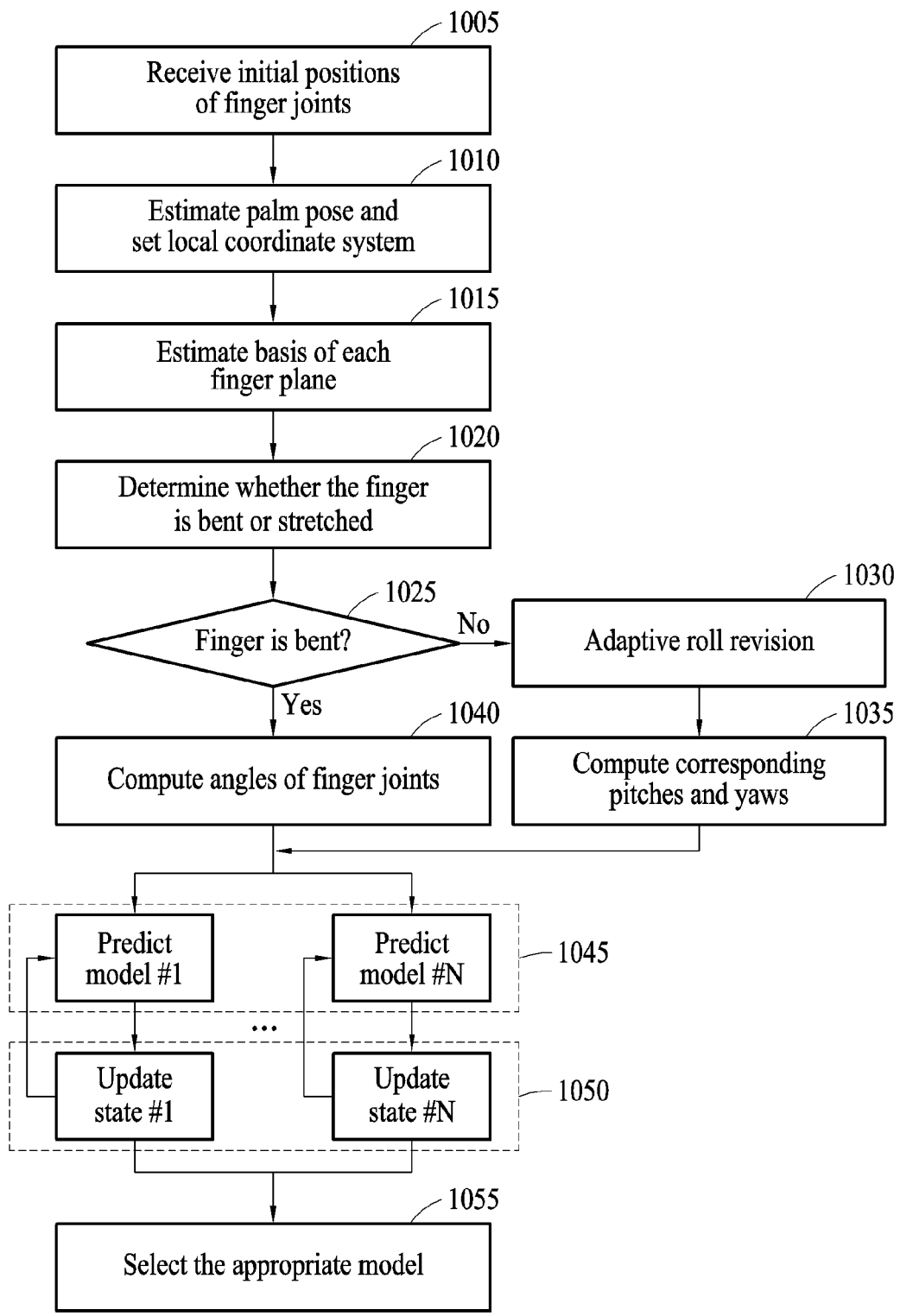

FIG. 10 illustrates an example of a method of tracking hand joints. Referring to FIG. 10, a process of tracking hand joints using multiple models is illustrated. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIGS. 1-9 are also applicable to FIG. 10, and are incorporated herein by reference.

Operations 1005 to 1040 of FIG. 10 are the same as operations 705 to 740 of FIG. 7. Thus, the above description may not be repeated here, and only operations differing from the example of FIG. 7 will be described.

In the example described with reference to FIG. 7, a single state transition matrix F and a single system model function h were used to predict and update the state vector. However, since the hand moves in various ways depending on a situation, state transition functions and system model functions optimized for each situation may also be used to predict the state vector.

In operation 1045, the tracking apparatus may predict a state vector using prediction models into which the state transition functions and the system model functions optimized for each situation are combined.

In operation 1050, the tracking apparatus may update the current state vector based on the state vector predicted in operation 1045.

In operation 1055, the tracking apparatus may select an appropriate prediction model suitable for each situation to update the positions and angles of the hand joints.

The tracking apparatus may perform prediction and/or update according to various prediction models corresponding to each situation, and select an output of a prediction model that best suits the current situation or calculate a weighted average of the values output from several prediction models.

Figure 11:
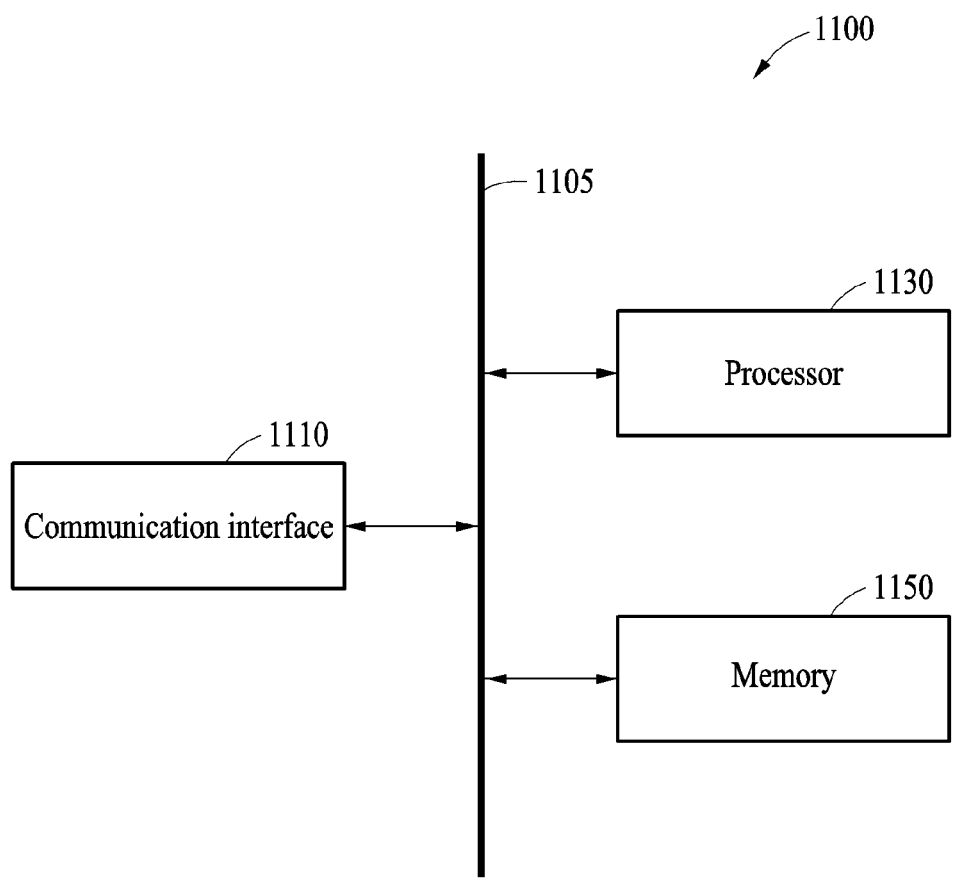
FIG. 11 illustrates an example of an apparatus for tracking hand joints.

FIG. 11 illustrates an example of an apparatus for tracking hand joints. Referring to FIG. 11, an apparatus 1100 for tracking hand joints (hereinafter, the "tracking apparatus" 1100) includes a communication interface 1110, a processor 1130, and a memory 1150. The communication interface 1110, the processor 1130, and the memory 1150 may be connected to each other through a communication bus 1105.

The communication interface 1110 receives initial positions of hand joints obtained from an image. Further, the communication interface 1110 may transmit a result of tracking hand joints by the processor 1130 (for example, the positions and angles of the hand joints) to outside of the tracking apparatus 1100.

The processor 1130 estimates angle information of the finger joints based on the initial positions of the hand joints received through the communication interface 1110. The processor 1130 generates a kinematic model of the hand joints of a user based on the initial positions and the angle information. The processor 1130 tracks the hand joints by updating at least one of the positions and angles of the hand joints based on the initial positions and the kinematic model.

However, the operation of the processor 1130 is not limited thereto. In an example, the processor 1130 may perform the above operation together with at least one of the operations described above with reference to FIGS. 1 to 10.

The processor 1130 may be a neural network or tracking apparatus implemented by hardware including a circuit having a physical structure to perform desired operations. For example, the desired operations may include instructions or codes included in a program. For example, the hardware-implemented tracking apparatus may include for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 1130 is given below.

The processor 1130 may execute the program and control the tracking apparatus 1100. Program codes to be executed by the processor 1130 may be stored in the memory 1150.

The memory 1150 may store the initial positions of the finger joints received through the communication interface 1110. The memory 1150 may store the angle information of the finger joints estimated by the processor 1130 and/or the kinematic model of the finger joints of the user generated by the processor 1130. In addition, the memory 1150 may store the positions and angles of the hand joints tracked by the processor 1130.

In addition, the memory 1150 may store a variety of information generated by the processor 1130 described above. In addition, the memory 1150 may store a variety of data and programs. The memory 1150 may include a volatile memory or a non-volatile memory. In an example, the memory 1150 may include a large-capacity storage medium such as a hard disk to store a variety of data.

In an example, the volatile memory device may be, for example, a dynamic random-access memory (DRAM), a static RAM (SRAM), a thyristor RAM (T-RAM), a zero-capacitor RAM (Z-RAM), or a twin-transistor RAM (TTRAM).

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 1150 is given below.

The apparatus 1100 for tracking hand joints apparatuses, a hand pose estimation module 210, an apparatus 230 for tracking hand joints, a joint angle estimation module 231, a tracking module 235, and other devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the method of method of tracking hand joints. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method, the method comprising:
    performing respective rotation conversions of initial positions of hand joints based on a set three-dimensional (3D) coordinate system, wherein the initial positions are obtained from an image of a hand and reflect a current pose of the hand;
    estimating angle information, of the current pose, of finger joints resulting from the respective rotation conversions of the initial positions of the hand joints, with at least some of the respective rotation conversions corresponding to different rotations;
    generating a kinematic model of the hand joints based on the initial positions of the hand joints and the angle information of the finger joints; and
    tracking the hand joints by generating at least one of updated positions or angles of the hand joints in the current pose based on the initial positions of the hand joints and the kinematic model,
    wherein the estimating of the angle information further includes performing the estimating of the angle information of the finger based on a selected, based on the determination of whether the finger joint is bent, one among a consideration of a geometry among multiple finger joints in the image and a consideration of a calculated finger joint angle in a previous image.

2. The method of claim 1, wherein the performing of the respective rotation conversions comprises
    performing the respective rotation conversions of the initial positions to a same plane for each of the finger joints based on a set 3D local coordinate system as the set 3D coordinate system.

3. The method of claim 2, further comprising:
    setting the 3D local coordinate system based on pose information of a palm connected to the finger joints, including:
    estimating the pose information of the palm from position information of joints of the palm; and
    generating 3D local coordinate axes, of the 3D local coordinate system, having a point in the palm as the origin based on the pose information of the palm.

4. The method of claim 2, further comprising setting the 3D local coordinate system based on pose information of a palm connected to the finger joints, and
    wherein the performing of the respective rotation conversions for each of the finger joints further comprises:
        determining whether the finger joints are bent based on the 3D local coordinate system; and
        adaptively calculating rotation conversion information for each of the finger joints based on a result of the determining of whether the finger joints are bent.

5. The method of claim 4, wherein the performing of the respective rotation conversions includes performing the respective rotation conversions for all the hand joints according to a rotation matrix for rotating all the hand joints based on the 3D local coordinate system, and
    wherein the determining of whether the finger joints are bent comprises:
        calculating a basis of the plane on which each finger is located, in response to all the hand joints being on the plane due to the respective rotation conversions;
        estimating yaw angles of the finger joints according to a bending estimation parameter based on the basis; and
        determining whether the finger joints are bent based on a comparison of the estimated yaw angles to a threshold.

6. The method of claim 4, wherein the adaptively calculating of the rotation conversion information comprises:
    estimating first roll angles of the finger joints based on a geometry of the finger joints in the image, in response to a result of the determining being that the finger joints are bent; and
    calculating pitch angles and yaw angles of the finger joints based on the first roll angles.

7. The method of claim 4, wherein the adaptively calculating of the rotation conversion information comprises:
    estimating second roll angles of at least some of the finger joints based on roll angles of the at least some finger joints in a previous image and initial roll angles that are set for the at least some finger joints, in response to a result of the determining being that the finger joints are stretched; and
    calculating pitch angles and yaw angles of the at least some finger joints based on the second roll angles.

8. The method of claim 7, wherein the estimating of the second roll angles comprises estimating the second roll angles of the some of the finger joints further based on angles of other fingers in the image.

9. The method of claim 1, wherein the tracking comprises:
    updating at least one of the initial positions of the finger joints or the angle information of the finger joints, respectively as the generated updated positions or angles, by an extended Kalman filter that is based on the kinematic model.

10. The method of claim 9, wherein the updating of the at least one of the initial positions of the finger joints or the angle information of the finger joints comprises:
    setting, as a state of the image, angles of the hand joints and a position and velocity of a wrist that are obtained by the extended Kalman filter;
    predicting positions and angles of the hand joints in a future image from the state of the image; and
    generating the updated positions and angles of the hand joints based on the predicted positions and angles.

11. The method of claim 1, wherein the initial positions and angle information of the hand joints are dependent on a positional relationship between hand joints that are connected to each other.

12. The method of claim 1, wherein some of the initial positions and angle information of the hand joints are determined based on a position of a hand joint, adjacent to a wrist, among hand joints connected to each other and an angle at which the hand joint is bent relative to a position of the wrist.

13. The method of claim 1, wherein the image includes image frames, and
the method further comprises calculating the initial positions from the image frames.

14. A non-transitory computer-readable storage medium storing instructions that, when executed by one or more processors, cause the processor to perform the method of claim 1.

15. An apparatus, the apparatus comprising:
one or more processors configured to:
perform respective rotation conversions of initial positions of hand joints based on a set three-dimensional (3D) coordinate system, wherein the initial positions are obtained from an image of a hand and reflect a current pose of the hand;
estimate angle information, of the current pose, of finger joints resulting from the respective rotation conversions of the initial positions of the hand joints, with at least some of the respective rotation conversions corresponding to different rotations;
generate a kinematic model of the hand joints based on the initial positions of the hand joints and the angle information of the finger joints; and
track the hand joints by generating at least one of updated positions or angles of the hand joints in the current pose based on the initial positions of the hand joints and the kinematic model,
wherein the estimating of the angle information further includes performing the estimating of the angle information of the finger based on a selected, based on the determination of whether the finger joint is bent, one among a consideration of a geometry among multiple finger joints in the image and a consideration of a calculated finger joint angle in a previous image.

16. The apparatus of claim 15, wherein, for the performing of the respective rotation conversion, the one or more processors are configured to perform the respective rotation conversions of the initial positions to a same plane based on a 3D local coordinate system as the set 3D coordinate system.

17. The apparatus of claim 16, wherein the one or more processors are further configured to set the 3D local coordinate system based on pose information of a palm connected to the finger joints, including an estimation of the pose information of the palm from position information of joints of the palm, and a generation of 3D local coordinate axes, of the 3D local coordinate system, having a point in the palm as the origin based on the pose information of the palm.

18. The apparatus of claim 16,
wherein the one or more processors are further configured to set the 3D local coordinate system based on pose information of a palm connected to the finger joints, and
wherein, for the respective rotation conversions for each of the finger joints, the one or more processors are further configured to determine whether the finger joints are bent based on the 3D local coordinate system, and to adaptively calculate rotation conversion information for each of the finger joints based on a result of the determining of whether the finger joints are bent.

19. The apparatus of claim 18,
wherein, for the respective rotation conversions for each of the finger joints, the one or more processors are configured to performing the respective rotation conversions for all the hand joints according to a rotation matrix for rotating all the hand joints based on the 3D local coordinate system; and
wherein, for the determining of whether the finger joints are bent, the one or more processors are configured to:
calculate a basis of the plane on which each finger is located, in response to all the hand joints being on the plane due to the respective rotation conversions;
estimate yaw angles of the finger joints according to a bending estimation parameter based on the basis; and
determine whether the finger joints are bent based on a comparison of the estimated yaw angles to a threshold.

20. The apparatus of claim 15, wherein, for the generating of the at least one of the updated positions or angles, the one or more processors are configured to update at least one of the initial positions of the finger joints or the angle information of the finger joints, respectively as the updated position or angles, by an extended Kalman filter that is based on the kinematic model.

21. An apparatus for tracking hand joints, the apparatus comprising:
one or more processors configured to:
estimate three-dimensional (3D) position information of hand joints from an image of a hand;
estimate angle information of the hand joints based on the 3D position information of the hand joints;
generate a kinematic model of the hand joints based on the 3D position information and the angle information of the hand joints;
update at least one of the 3D position information or the angle information of the hand joints by an extended Kalman filter based on the kinematic model; and
track the hand joints based on the updated position information or the updated angle information,
wherein the 3D local coordinate system is set based on pose information of a palm connected to finger joints of the hand, and
wherein the estimating of the angle information further includes:
a determination of whether the finger joints are bent based on the 3D local coordinate system; and
an estimation of first roll angles of the finger joints based on a geometry of the finger joints in the image, in response to a result of the determination being that the finger joints are bent.

22. The apparatus of claim 21, wherein, for the estimation of the angle information, the one or more processors are further configured to:
estimate second roll angles of the finger joints based on roll angles of the finger joints in a previous image and initial roll angles that are set for the finger joints, in response to the result of the determination being that the finger joints are not bent; and
calculate pitch angles and yaw angles of the finger joints based on one of the first roll angles and the second roll angles.

23. The apparatus of claim 20, further comprising a communication interface configured to transmit a result of the tracking of the hand joints to outside the apparatus.

24. The apparatus of claim 20, further comprising an image sensor that captures the image.

25. The apparatus of claim 20, further comprising a memory, wherein the one or more processors are further configured to store, in the memory, the angle information of the hand joints, the 3D position information of the hand joints, the updated 3D position information, and the updated angle information of the hand joints.

26. The method of claim 1, wherein the tracking comprises updating at least one of the initial positions of the finger joints or the angle information of the finger joints by predicting positions of the hand joints in a future image and generating the updated positions of the hand joints based on the predicted positions, and/or predicting angles of the hand joints in the future image and generating the updated angles of the hand joints based on the predicted angles.

27. A method, the method comprising:
performing respective rotation conversions of initial positions of hand joints based on a set three-dimensional (3D) coordinate system, wherein the initial positions are obtained from an image of a hand and reflect a current pose of the hand;
estimating angle information, of the current pose, of finger joints resulting from the respective rotation conversions of the initial positions of the hand joints, with at least some of the respective rotation conversions corresponding to different rotations;
generating a kinematic model of the hand joints based on the initial positions of the hand joints and the angle information of the finger joints; and
tracking the hand joints by generating at least one of updated positions or angles of the hand joints in the current pose based on the initial positions of the hand joints and the kinematic model,
wherein the estimating of the angle information further includes a first estimation of respective first angles of one or more of the finger joints based on a geometry of multiple finger joints in the image, and a second estimation of respective second angles of a different one or more of the finger joints based on consideration of calculated angles of finger joints in a previous image.

* * * * *